United States Patent
Chou

(10) Patent No.: US 7,813,630 B2
(45) Date of Patent: Oct. 12, 2010

(54) IMAGE CAPTURING DEVICE WITH A VOICE COMMAND CONTROLLING FUNCTION AND METHOD THEREOF

(75) Inventor: Meng-Chieh Chou, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 122 days.

(21) Appl. No.: 12/234,715

(22) Filed: Sep. 22, 2008

(65) Prior Publication Data

US 2009/0162043 A1    Jun. 25, 2009

(30) Foreign Application Priority Data

Dec. 19, 2007    (CN) .................... 2007 1 0203206

(51) Int. Cl.
*G03B 17/00* (2006.01)
*H04N 5/232* (2006.01)
(52) U.S. Cl. .................................. 396/56; 348/211.99
(58) Field of Classification Search .................. 396/56; 348/211.99
See application file for complete search history.

(56) References Cited

U.S. PATENT DOCUMENTS

| | | | |
|---|---|---|---|
| 4,389,109 A * | 6/1983 | Taniguchi et al. | 396/56 |
| 5,027,149 A * | 6/1991 | Hoshino et al. | 396/56 |
| 6,289,140 B1 * | 9/2001 | Oliver | 382/313 |
| 7,499,859 B2 * | 3/2009 | Lu et al. | 704/270 |
| 2003/0133022 A1 * | 7/2003 | Melton | 348/231.2 |
| 2005/0118990 A1 * | 6/2005 | Stephens | 455/418 |
| 2007/0200912 A1 * | 8/2007 | Hung | 348/14.01 |
| 2008/0036869 A1 * | 2/2008 | Gustafsson et al. | 348/222.1 |
| 2009/0192801 A1 * | 7/2009 | Chou | 704/275 |

FOREIGN PATENT DOCUMENTS

CN    1258162 A    6/2000

* cited by examiner

*Primary Examiner*—Rodney E Fuller
(74) *Attorney, Agent, or Firm*—Frank R. Niranjan

(57) ABSTRACT

An image capturing device with a voice command controlling function is provided. The image capturing device includes a voice command input unit and a voice command controlling chip. The voice command input unit receives standard voice commands and common voice commands. The voice command controlling chip determines if a common voice command satisfies a predetermined voice command identification standard, by comparing characteristics of the common voice command with characteristics of each of the standard voice commands. If the common voice command satisfies the predetermined voice command identification standard, the voice command controlling chip generates a controlling command according to the common voice command and drives an image capturing unit to perform a corresponding operation according to the command. A related method is also provided.

17 Claims, 3 Drawing Sheets

IMAGE CAPTURING DEVICE WITH A VOICE COMMAND CONTROLLING FUNCTION AND METHOD THEREOF

BACKGROUND

1. Field of the Invention

Embodiments of the present disclosure relate to devices and methods for capturing images, and particularly to an image capturing device with a voice command controlling function and implementation method thereof.

2. Description of Related Art

Digital image capturing devices, e.g., digital cameras, camera phones and personal digital assistants (PDAs), are very popular due to features that are not found in film cameras. These features includes displaying an image on a screen immediately after the image is recorded, a capacity to take thousands of images on a single small memory device, an ability to record video with sound, an ability to edit images, and to delete images so as to allow re-use of the storage they occupied, and so on. However, some operations still need to be enabled manually, such as operations of taking photos and deleting images rely on a user to press corresponding buttons on the image capturing devices.

What is needed, therefore, is an image capturing device with more intelligent functions, which may help users to control the image capturing device without manual operations.

SUMMARY

An image capturing device with a voice command controlling function is provided. The image capturing device comprises a voice command input unit and a voice command controlling chip. The voice command input unit is configured for receiving standard voice commands and common voice commands. The voice command controlling chip comprises: a setting module, a voice command information storing module, a voice command information analyzing module, and a controlling module. The setting module is configured for setting a voice command identification standard. The voice command information storing module is configured for storing the standard voice commands and the voice command identification standard into a storage unit. The voice command information analyzing module is configured for analyzing characteristics of a common voice command, determining if the common voice command satisfies the voice command identification standard of any standard voice command by comparing the characteristics of the common voice command with characteristics of each of the standard voice commands, and generating a controlling command according to the common voice command, if the common voice command satisfies the voice command identification standard. The controlling module is configured for controlling an image capturing unit to perform a corresponding operation according to the controlling command.

Other objects, advantages and novel features will become more apparent from the following detailed description of certain embodiments of the present disclosure when taken in conjunction with the accompanying drawings.

DETAILED DESCRIPTION OF CERTAIN INVENTIVE EMBODIMENTS

Figure 1:
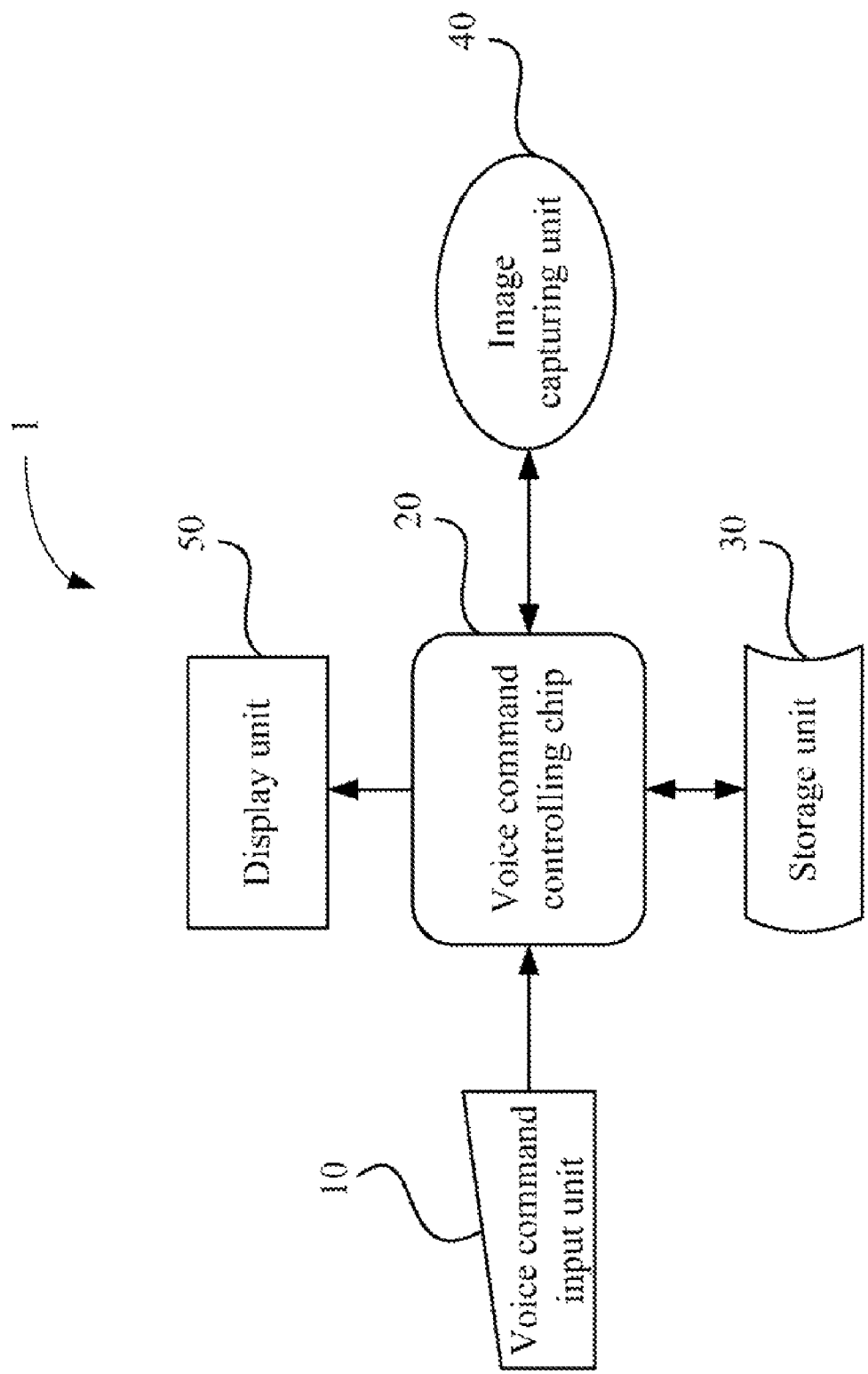
FIG. 1 is a block diagram of one embodiment of an image capturing device with a voice command controlling function.

FIG. 1 is a block diagram of one embodiment of an image capturing device 1 with a voice command controlling function. The image capturing device is configured for capturing images according to voice commands. In one embodiment, the image capturing device 1 comprises a voice command input unit 10, a voice command controlling chip 20, a storage unit 30, an image capturing unit 40, and a display unit 50. The image capturing device 1 may be a digital camera, a camera phone, a PDA, or any other digital products with image capturing functions. The voice command input unit 10, the storage unit 30, the image capturing unit 40 and the display unit 50 are electronically connected with the voice command controlling chip 20.

The voice command input unit 10 is configured for receiving one or more voice commands inputted by users. Each of the one or more voice commands may be a standard voice command or a common voice command of a user. The standard voice command are usually pre-recorded by the voice command input unit 10, and stored in the storage unit 30. The voice command input unit 10 may be a microphone, a recorder, or any other electronic devices that may record voice commands. It may be understood that a user may be a manufacturer of the image capturing device 1, or a buyer of the image capturing device 1. If the standard voice commands are inputted by the manufacturer or other users, a user may listen to a record of the standard voice commands, so as to control pronunciation when speaking to the image capturing device 1 for inputting a common voice command. For example, a standard voice command may be "take a photo" or "take three photos consecutively." Then, if the user wants the image capturing device 1 to take a photo one time, the user may speak "take a photo" to the voice command input unit 10. If the user wants the image capturing device 1 to take 3 photos consecutively, the user may speak "take three photos consecutively" to the voice command input unit 10.

The voice command controlling chip 20 comprises a plurality of functional modules (detailed description is given in FIG. 2), and is configured for setting a voice command identification standard for the common voice commands of any user. The voice command controlling chip 20 is further configured for determining whether a common voice command satisfies the voice command identification standard, and generating a controlling command according to the common voice command if the common voice command satisfies the voice command identification standard.

The storage unit 30 is configured for storing the standard voice commands and the voice command identification standard. Furthermore, the storage unit 30 is configured for storing images captured by the image capturing unit 40. Depending on the embodiment, the storage unit 30 may be a read only memory (ROM), an electrically erasable, programmable, read only memory (EEPROM), a random access memory (RAM), or any other kind of memory.

The image capturing unit 40 is configured for capturing one or more images according to the controlling command. In one embodiment, the image capturing unit 40 may comprise a lens, a transducer, such as a charge coupled device (CCD), and other elements (not shown in FIG. 1).

The display unit 50 is configured for displaying the images captured by the image capturing unit 40. The display unit 50 may be a liquid crystal display (LCD).

Figure 2:
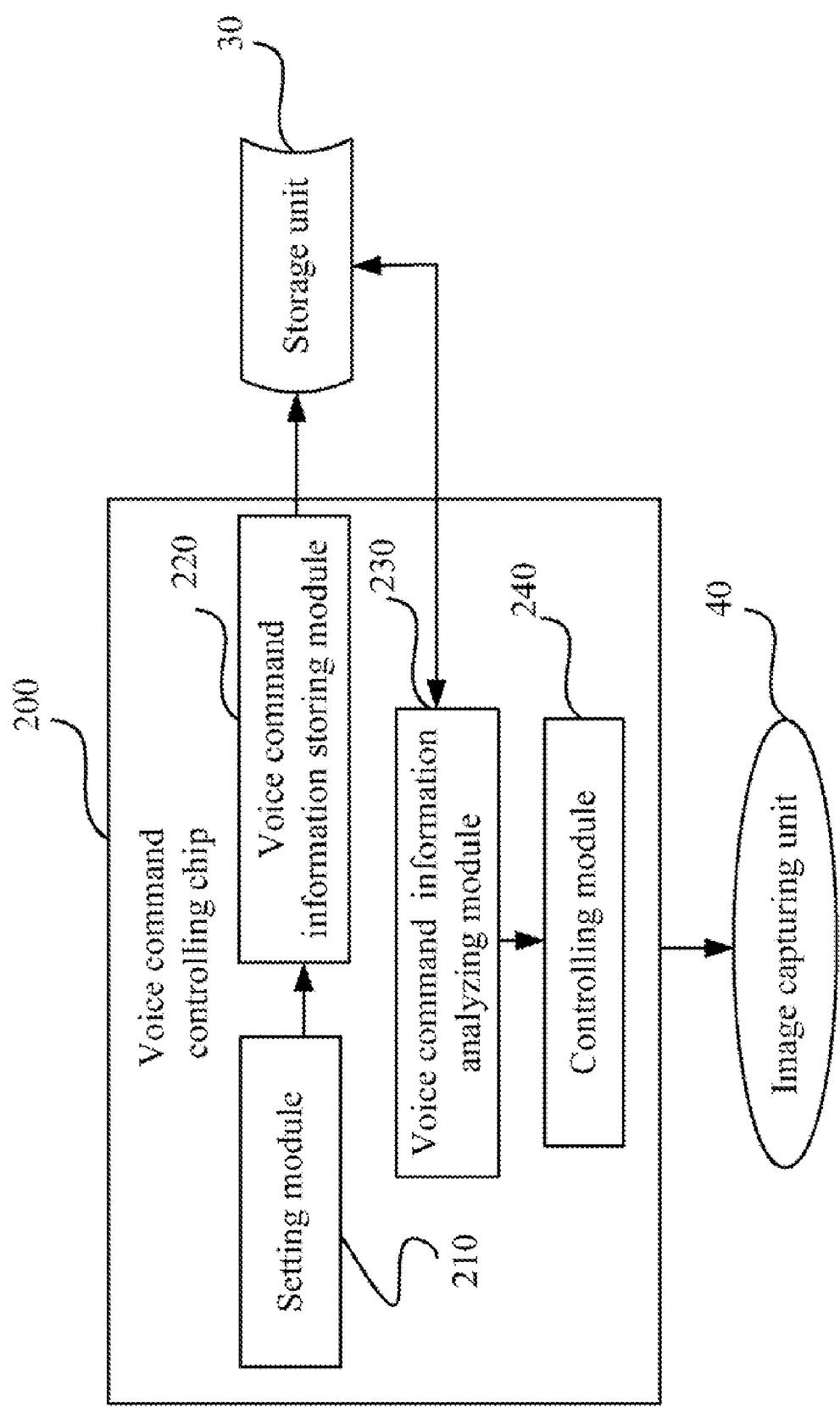
FIG. 2 is a block diagram of one embodiment of a voice command controlling chip in FIG. 1.

FIG. 2 is a block diagram of one embodiment of the voice command controlling chip 20 in FIG. 1. In the illustrated embodiment, the voice command controlling chip 20 comprises a setting module 210, a voice command information storing module 220, a voice command information analyzing module 230, and a controlling module 240. The modules 210, 20, 230, 240 may be used to execute one or more commands for the controlling chip 20.

The setting module 210 is configured for setting the voice command identification standard for the common voice commands. In one embodiment, the voice command identification standard defines a similarity degree between characteristics of any common voice command and the characteristics of a corresponding standard voice command. For example, the similarity degree may be set as 40%. The characteristics of a voice command may comprise a frequency, amplitude, a volume and a pulse width of the voice command. In one embodiment, if the similarity degree between each characteristic of a common voice command and each corresponding characteristic of a corresponding standard voice command is more than or equal to 40%, the common voice command is regarded as the standard voice command.

The voice command information storing module 220 is configured for storing the voice command identification standard and the standard voice commands into the storage unit 30.

The voice command information analyzing module 230 is configured for analyzing the characteristics of a common voice command received from the voice command input unit 10, and comparing the characteristics of the common voice command with the characteristics of each of the standard voice commands, so as to determine if the common voice command satisfies the voice command identification standard. If the common voice command satisfies the voice command identification standard, the voice command information analyzing module 230 determines that the common voice command is the standard voice command, and generates a controlling command according to the common voice command.

The controlling module 240 is configured for controlling the image capturing device 40 to perform a corresponding operation according to the controlling command, such as taking one photo or taking three photos consecutively.

Figure 3:
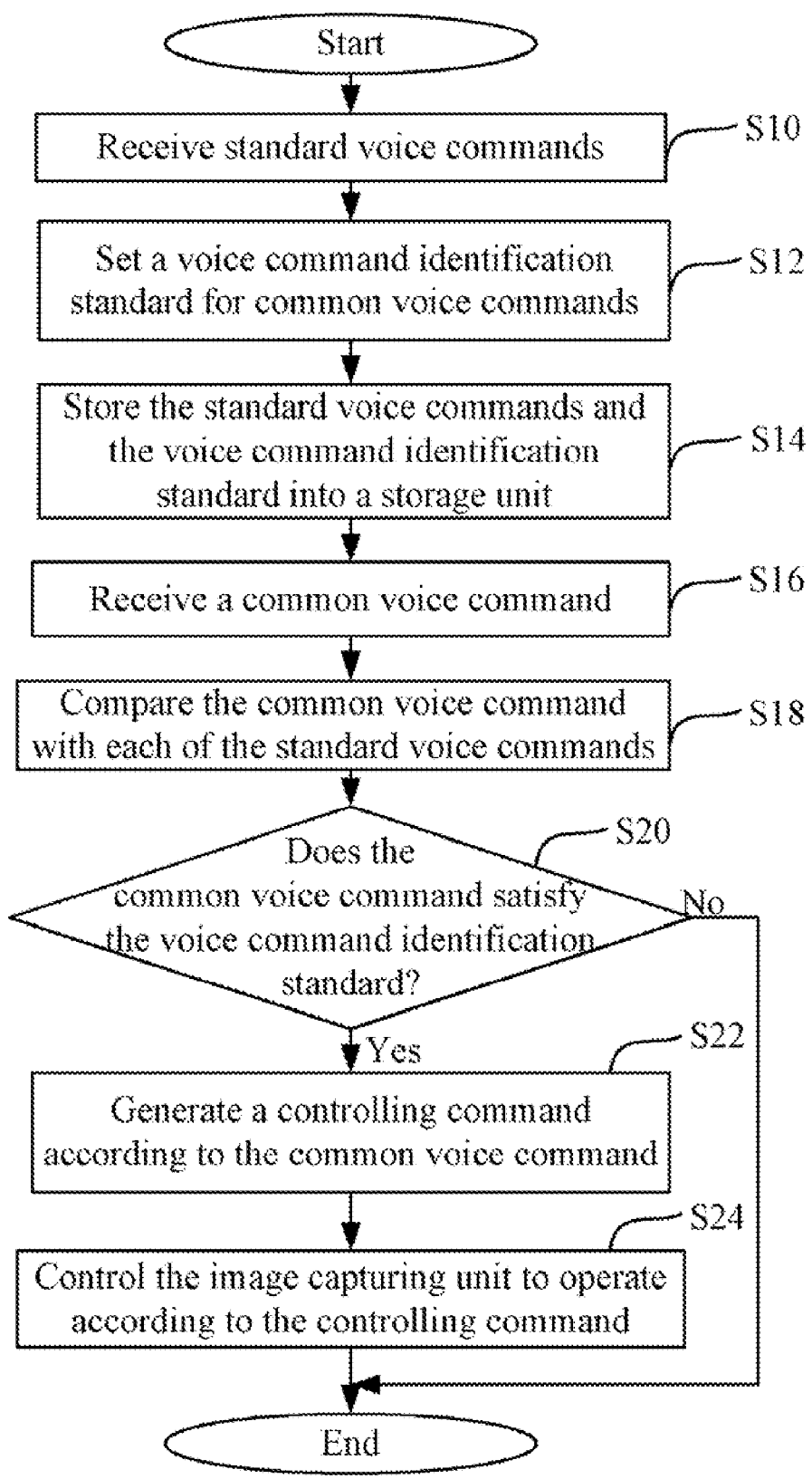
FIG. 3 is a flowchart of one embodiment of an implementation method of an image capturing device with a voice command controlling function.

FIG. 3 is a flowchart of one embodiment of an implementation method of an image capturing device with a voice command controlling function. Depending on the embodiment, additional blocks may be added, others removed, and the ordering of the blocks may be changed.

In block S10, the voice command input unit 10 receives standard voice commands inputted by a user. It may be understood that the user may be a manufacturer of the image capturing device 1, a buyer, or any other valid owners of the image capturing device 1. In one embodiment, a standard voice command may be a pronunciation of "take a photo" or a pronunciation of "take three photos consecutively" spoke by the user.

In block S12, the setting module 210 sets a voice command identification standard for common voice commands of any user. In one embodiment, the voice command identification standard defines a similarity degree, e.g., "40%," between characteristics of any common voice command and the characteristics of a corresponding standard voice command. It may be understood that the characteristics comprise a frequency, amplitude, a volume and a pulse width of the voice command.

In block S14, the voice command information storing module 220 stores the voice command identification standard and the standard voice commands into the storage 30.

In block S16, the voice command input unit 10 receives a common voice command input by a user. For example, the voice command input unit 10 receives a voice command of "take one photo" input by the user.

In block S18, the voice command information analyzing module 230 analyzes the characteristics of the common voice command, and compares the characteristics of the common voice command with the characteristics of each of the standard voice commands stored in the storage unit 30. In step S20, the voice command information analyzing module 230 determines if the common voice command satisfies the voice command identification standard according to the comparison result. In one embodiment, the voice command information analyzing module 230 determines if the similarity degree between each characteristic of the common voice command and each corresponding characteristic of any standard voice command is more than or equal to 40%. If the common voice command satisfies the voice command identification standard, the procedure goes to block S22.

In block S22, the voice command information analyzing module 230 generates a command according to the common voice command. In block S24, the controlling module 240 controls the image capturing device 40 to perform a corresponding operation according to the command, such as taking one photo.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image capturing device with a voice command controlling function for controlling operation of the image capturing device, the image capturing device comprising:

a voice command input unit configured for receiving standard voice commands and common voice commands, wherein the standard voice commands comprise speeches pre-recorded by the voice command input unit, and the common voice commands comprise speeches inputted by a user; and a voice command controlling chip being connected to the voice command input, the voice command controlling chip comprising:

a setting module configured for setting a voice command identification standard for the common voice commands, wherein the voice command identification standard defines a similarity degree between characteristics of each of the common voice commands and characteristics of a corresponding standard voice command;

a voice command information storing module configured for storing the standard voice commands and the voice command identification standard into a storage unit;

a voice command information analyzing module configured for analyzing the characteristics of a common voice command received by the voice command input unit, determining if the common voice command satisfies the voice command identification standard by comparing the characteristics of the common voice command with the characteristics of the corresponding standard voice command, and generating a controlling command according to the common voice command upon the condition that the common voice command satisfies the voice command identification standard; and a controlling module configured for controlling an image capturing unit to capture one or more images according to the controlling command.

2. The image capturing device of claim 1, wherein the characteristics of each of the voice commands comprise a frequency, amplitude, a volume and a pulse width of the voice command.

3. The image capturing device of claim 1, further comprising a display unit configured for displaying the one or more images captured by the image capturing unit.

4. The image capturing device of claim 1, wherein the voice command input unit is either a microphone or a voice command recorder.

5. The image capturing device of claim 1, wherein the storage unit is selected from the group consisting of a read only memory (ROM), an electrically erasable, programmable, read only memory (EEPROM), and a random access memory (RAM).

6. The image capturing device of claim 1, wherein the image capturing unit comprises a charge coupled device.

7. A method for controlling operation of an image capturing device via voice commands, the method comprising:
receiving standard voice commands via an voice command input unit, wherein the standard voice commands comprise speeches pre-recorded by the voice command input unit;
setting a voice command identification standard for common voice commands, wherein the common voice commands comprise speeches of any user, and the voice command identification standard defines a similarity degree between characteristics of each of the common voice commands and characteristics of a corresponding standard voice command;
receiving a common voice command via the voice command input unit;
analyzing the characteristics of the common voice command;
determining if the common voice command satisfies the voice command identification standard by comparing the characteristics of the common voice command with the characteristics of the corresponding standard voice command;
generating a controlling command according to the common voice command if the common voice command satisfies the voice command identification standard; and
controlling an image capturing unit to capture one or more images according to the controlling command.

8. The method of claim 7, the method further comprising:
storing the standard voice commands and the voice command identification standard into a storage unit.

9. The method of claim 8, wherein the storage unit is selected from the group consisting of a read only memory (ROM), an electrically erasable, programmable, read only memory (EEPROM), and a random access memory (RAM).

10. The method of claim 7, wherein the characteristics of each of the voice commands comprise a frequency, amplitude, a volume and a pulse width of the voice command.

11. The method of claim 7, wherein the voice command input unit is either a microphone or a voice command recorder.

12. The method of claim 7, wherein the image capturing unit comprises a charge coupled device.

13. A non-transitory storage medium having stored thereon instructions for controlling operation of an image capturing device via voice commands, when executed by the image capturing device, causing the image capturing device to perform a method comprising:
receiving standard voice commands via an voice command input unit;
setting a voice command identification standard for common voice commands, wherein the voice command identification standard defines a similarity degree between characteristics of each of the common voice commands and characteristics of a corresponding standard voice command;
receiving a common voice command via the voice command input unit;
analyzing the characteristics of the common voice command;
determining if the common voice command satisfies the voice command identification standard by comparing the characteristics of the common voice command with the characteristics of the corresponding standard voice command;
generating a controlling command according to the common voice command if the common voice command satisfies the voice command identification standard; and
controlling an image capturing unit to capture one or more images according to the controlling command.

14. The non-transitory storage medium of claim 13, wherein the method further comprises:
storing the standard voice commands and the voice command identification standard into a storage unit.

15. The non-transitory storage medium of claim 14, wherein the storage system is selected from the group consisting of a read only memory (ROM), an electrically erasable, programmable, read only memory (EEPROM), and a random access memory (RAM).

16. The non-transitory storage medium of claim 13, wherein the characteristics of each of the voice commands comprise a frequency, amplitude, a volume and a pulse width of the voice command.

17. The non-transitory storage medium of claim 13, wherein the voice command input unit is either a microphone or a voice command recorder.

* * * * *